June 23, 1970        G. A. WILL        3,516,384
ULTRASONIC WARNING SYSTEM
Filed Dec. 7, 1966
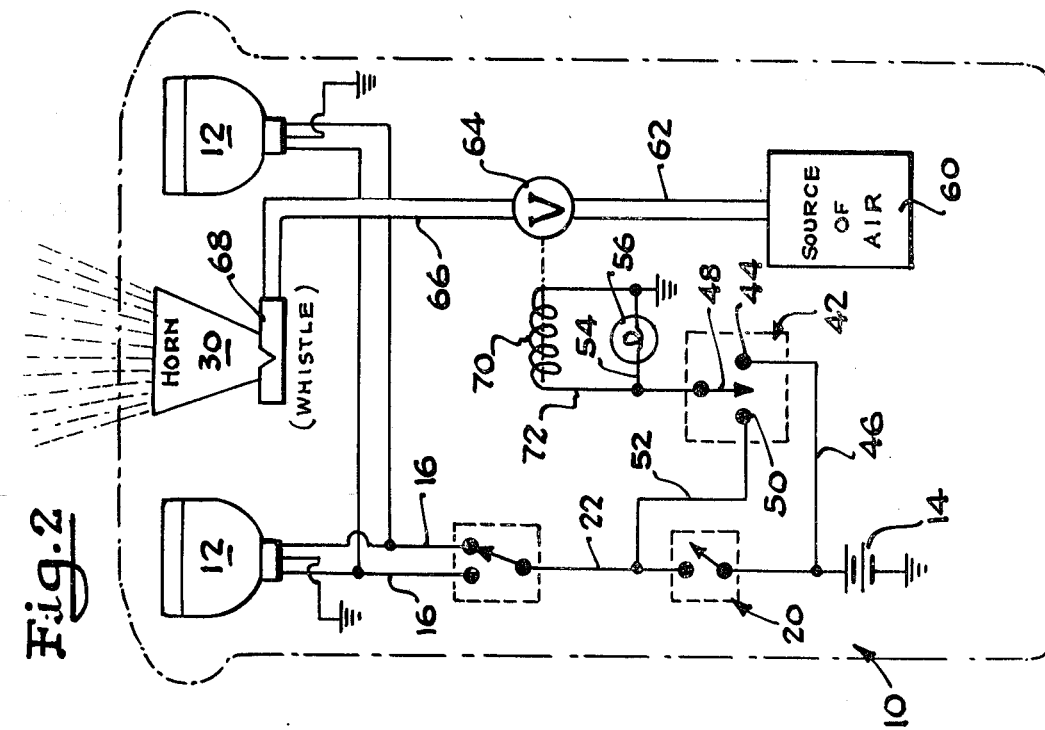
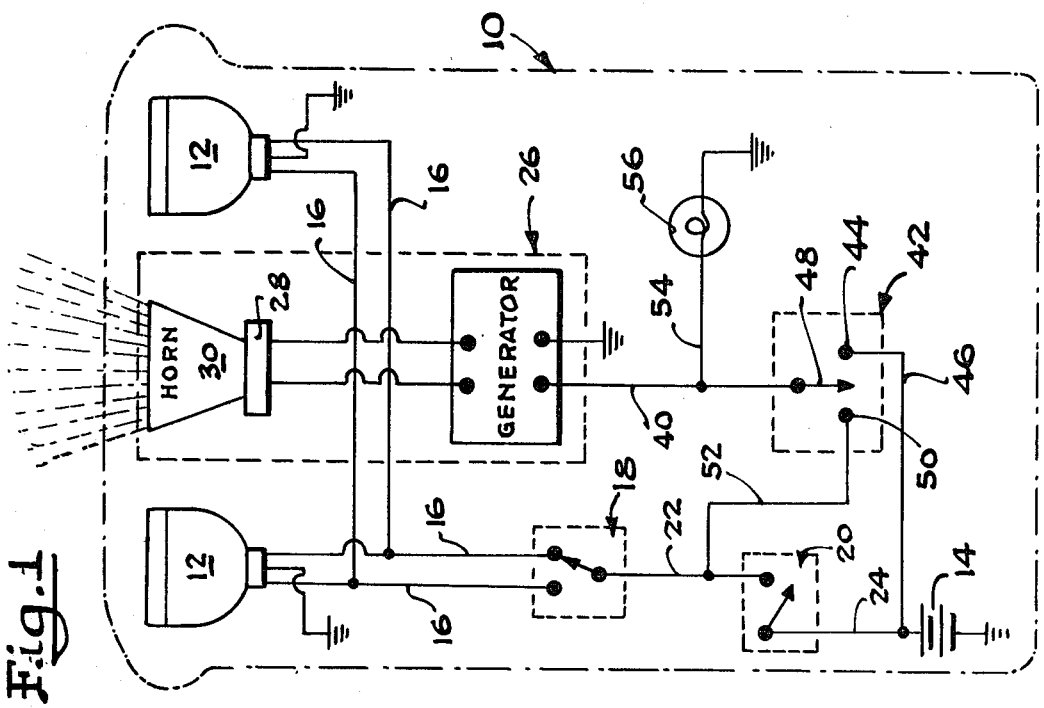
Inventor
George A. Will
By Darbo, Robertson & Vandenburgh
Attorneys 3,516,384
ULTRASONIC WARNING SYSTEM
George A. Will, 514 Cheyenne Trail,
Carol Stream, Wheaton, Ill. 60187
Filed Dec. 7, 1966, Ser. No. 599,750
Int. Cl. B06b 3/00
U.S. Cl. 116—137                                                   13 Claims

ABSTRACT OF THE DISCLOSURE

A warning system in combination with a vehicle in which ultrasonic sound is beamed in advance of the moving vehicle on a thoroughfare so that said sound may be heard by an animal ahead of the moving vehicle to induce the animal to leave the road before it is struck by the vehicle. The emission of the ultrasonic sounds may be actuated by the turning on of the headlights of the vehicle or by independent switch means accessible to the operator of the vehicle. The ultrasonic sound beam is emitted in a controlled directional pattern so that the beam is not substantially wider than the width of the thoroughfare on which the vehicle is moving.

BACKGROUND OF THE INVENTION

The problem of automotive vehicles and trains striking animals on highways or railway tracks is serious because of possible serious injury to the driver of the vehicle in the case of striking larger animals, resulting in serious damage to the vehicle, or because of the understandable reprehension of injuring or killing animals. This is a serious problem because a large number of animals are hit annually. The problem is particularly highlighted by considering the number of deer which are struck annually on the highways. The problem is one of great magnitude which is becoming more serious. The number of deer and automotive collisions was reported by 48 states as increasing an average of 33% for the year 1965. The total reported number of deer which were killed was 121,750. The National Safety Council reported that there were 115 human fatalities and about 7,500 injuries as a result of such collisions. Among the states which reported high figures for the number of deer and automotive vehicle collisions are Pennsylvania reporting 17,781; Wisconsin reporting 9,360; Texas reporting 14,250; California reporting 7,241; and Michigan reporting 6,052. Some efforts have been made to reverse this trend, such as the wider use of light reflectors along the highway, but there has been little substantial success in reducing the high incidence of such collisions. A principal object of the present invention is to provide an ultrasonic warning system which can be used in combination with a moving vehicle, and which warning system may be used to induce animals to leave the thoroughfare and avoid being struck by the moving vehicle.

In the same manner that deer have been rendered immobile by jacklighting when they are being hunted, the glare of automobile lights will transfix a deer. When this occurs even the desperate urging of an automobile horn is unlikely to have any effect. Through the use of the present invention the deer is frightened away by the ultrasonic sound before it is caught in the headlight glare and rendered immobile in the path of the vehicle.

Another object of this invention is to provide a warning system to be used in conjunction with an automobile or the like, which warning system may be actuated to operate continuously by a power source in the car so that said warning system operates independently of other units which may be controlled by the same power source.

Still another object of this invention is a warning system which may be actuated to operate continuously by being dependently responsive to the operation of the headlights of an automobile or the like. This object is served by actuating a warning system control means so that the conventional headlight switch means operate both the headlights and the warning system.

A further object of this invention is an ultrasonic warning system for use in combination with an automobile or the like wherein a horn is adapted to emit sound of ultrasonic frequency to induce animals to leave the road before a collision can occur. It is another feature of this object that the beam of emitted ultrasonic sound be controlled so its width is substantially not in excess of the width of the thoroughfare on which the vehicle is moving. It is an aspect of this latter object not to frighten or disturb animals, both domestic and wild, which are off the thoroughfare.

SUMMARY OF THE INVENTION

This invention relates to a warning system to be used in conjunction with an automotive vehicle or the like so that animals which may be present on a thoroughfare on which the vehicle is moving may be induced to leave the thoroughfare so as to avoid a collision. The invention particularly relates to an ultrasonic warning system in which ultrasonic sounds, which are inaudible by humans, may be perceived by the animals to induce them to leave the thoroughfare.

DESCRIPTION OF THE DRAWING

FIG. 1 is a schematic representation of an electrical powered warning system provided in combination with an automotive vehicle; and FIG. 2 is a schematic diagram of an air powered embodiment.

DESCRIPTION OF THE PREFERRED EMBODIMENTS

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Looking at the drawing, a schematic outline of an automobile is indicated generally at 10. At the front of the auto are a pair of headlights 12. These are powered by a battery or power source 14. Electrical conductors for the headlights are indicated at 16. These wires are shown connected to both headlights and to a dimmer switch 18 which controls the high and low beam elements of the headlights. A headlight switch 20 is shown to actuate the headlights by closing a connection between wire 22 which extends to the dimmer switch 18 and lead 24 which is connected to a terminal of the battery 14. The other side of the battery is grounded as is the other side of the two headlight filaments.

The foregoing schematically indicated structures and elements are conventional in automotive vehicles, and in combination with such structures and elements a warning system is provided which is indicated generally at 26. The warning system, illustrated in FIG. 1, is one which develops ultrasonic sound waves and it includes an electroacoustical transducer at 28. The sound from the transducer is emitted through a horn 30. Conductors 36 connect transducer 28 with an ultrasonic electrical generator 38 to carry the ultrasonic electrical impulses to the transducer 28. Power for operating generator 38 is supplied through a wire 40 connecting it to a multiple switch assembly 42. The other power connection is grounded to connect with the grounded side of the battery 14. Generator 38 may comprise, for example, an electrical oscillator and amplifier.

One terminal 44 of the switch is connected by a conductor 46 to voltage source 14. When switch element 48 contacts terminal 44 the circuit will be closed between the voltage source and the oscillator. Another terminal 50 of the switch is connected to lead 22 in the headlight assembly by a connecting wire 52. When switch 48 is contacted with terminal 50 then the oscillator will be operated simultaneously with the operation of the headlights.

A lead 54 is shown branching from lead 40 between the oscillator and the multiple switch, and this lead is connected to an indicator 56 which is shown as a pilot light. Operation of the pilot light will, of course, indicate operation of the warning system whether actuated independently of the headlights or simultaneously with the headlights.

In operation, the electro-acoustical transducer is mounted preferably towards the front of the car between the headlights. This may be any convenient spot on (or behind) the grill work at the front of the car. The horn 30 is directed so that the beam of ultrasonic sound is directed in advance of the moving vehicle on the highway. The directional pattern of the sound beam is such that its width is not substantially greater than the width of the thoroughfare. Thus, only animals on the highway in advance of the moving vehicle are induced to move away, and animals in farms, etc., alongside the thoroughfare, are not disturbed or frightened.

FIG. 2 illustrates an embodiment used with an automotive vehicle, such as a truck with air brakes, having a power source 60 of air under pressure. A pipe 62 connects source 60 with a valve 64. In turn, pipe 66 connects valve 64 with an ultrasonic whistle 68. The sound from whistle 68 is emitted through horn 30. Valve 64 is controlled by a solenoid 70. One side of solenoid 70 is grounded and the other side is connected by a wire 72 to switch element 48 of switch 42. When switch element 48 is positioned to supply power to solenoid 70, either from wire 46 or from wire 52 through switch 20, valve 64 is opened. With valve 64 open, air is supplied to whistle 68 to emit ultrasonic sound through horn 30.

The directional pattern or characteristic of a horn depends upon the shape and mouth opening of the horn, and the frequency of the sound waves which will be emitted. The directional pattern becomes sharper with an increase of the frequency, in fact, with a simple cone, the directional pattern becomes quite narrow at the higher ranges. The width of the beam cannot be too restricted or it will be ineffective to protect vehicles negotiating curves in the highway. If a particular horn does send out a too narrow pattern, conventional distributors may be added to the horn, such as vanes, to spread the ultrasonic sound radiations. Persons skilled in the art will readily know how to modify and prescribe requirements for various electro-acoustical transducers to obtain the desired directional pattern for the ultrasonic sound radiations. Such ultrasonic frequencies will be above the perceptive human threshold level, but will be readily sensed by animals. In general, frequencies in the range above about 20,000 c.p.s. may be used. The frequency range of the oscillator should be restricted so that no sound emitted from the horn is within the sonic range, i.e. audible to humans. Conventional controls extending from the oscillator may be conveniently placed near the driver for varying the frequency impulses from the oscillator, if desired.

The horn of the warning system should be placed so the beam of ultrasonic sound radiations are directed in advance of the direction in which the vehicle is moving. The horn has been shown as being between the headlights, but this is merely one advantageous position which has the further advantage that the horn can be hidden from view. The horn could likewise be placed in other locations, if desired.

The warning system is intended for use with an automotive vehicle, but such a system may be variously associated therewith. For example, a kit can be supplied which could be mounted to, say, the side of the car, and the kit could contain its own voltage or power source. Switch means could be connected to the kit and be placed inside the car to be controlled by the driver independently of the headlights or other electrical units of the car; or connections could be made to operate the warning system in conjunction with such electrical units. Other variations in use are possible.

The invention may now be practiced in the various ways which will occur to practitioners, and all such practice is a part of the present invention so long as it comes within the terms of the following claims as given further meaning by the language of the preceding specification.

I claim:
1. In combination with a vehicle having a power source, a warning system to induce animals to leave the thoroughfare on which the vehicle is traveling comprising:
   sound generating means for producing sound of a frequency above the range audible to persons and within the ultrasonic range audible to animals, said means being mounted on said vehicle in a position to project said sound ahead of said vehicle; and
   means connecting said device to said source to selectively activate said device at the option of the operator of the vehicle.

2. A warning system as set forth in claim 1, wherein said generating means includes a directional horn to confine the sound approximately to the thoroughfare on which the vehicle is traveling.

3. A warning system as set forth in claim 1, wherein said power source is a battery and said generating means includes an electro-acoustical transducer.

4. A warning system as in claim 3, wherein said generating means includes an electrical ultrasonic frequency signal generator connected to said transducer to deliver ultrasonic electrical impulses to the transducer which is adapted to emit the ultrasonic sounds, and said connecting means includes control switch means for connecting said generator to the power source to operate the same.

5. A warning system as in claim 4, in combination with a vehicle which is provided with headlights, and electrical conductors to connect the headlights to headlight switch means adapted to close the connection of the headlights to the power source, said control switch means being connected to said conductors so that operation of the headlights will operate the generator to simultaneously send the ultrasonic impulses to the transducer.

6. A warning system as set forth in claim 5, wherein said control switch means also is connected directly to said battery so that the generator may be energized independently of the headlights.

7. A warning system combination as in claim 6, wherein the generator is an oscillator adapted to deliver electrical impulses so the transducer emits sound having a minimum frequency of about 20,000 c.p.s.

8. A warning system as in claim 1, in combination with a vehicle which is provided with headlights, and electrical conductors to connect the headlights to headlight switch means adapted to close the connection of the headlights to the power source, said connecting means being connected to said conductors so that operation of the headlights will operate the device to simultaneously send ultrasonic impulses ahead of the vehicle.

9. An automotive warning system as set forth in claim 8, wherein said control switch means also is connected directly to said power source so that the generator may be energized independently of the headlights.

10. An automotive warning system as set forth in claim 9, for use wherein the power source includes a source of air under pressure, said device including a whistle, and said connecting means includes a solenoid actuated valve, and pipes connecting said valve with said air source and said whistle.

11. The method of protecting an automotive vehicle against collision with animals on the thoroughfare along which the vehicle is traveling, said method including the steps of generating and projecting a beam of ultrasonic sound, substantially free of sonic sound, ahead of the vehicle.

12. The method as set forth in claim 11, wherein said beam is confined to substantially the width of the thoroughfare.

13. The method as set forth in claim 11 wherein said beam is projected substantially continuously as the vehicle proceeds along the thoroughfare.

References Cited

UNITED STATES PATENTS

| | | | |
|---|---|---|---|
| 2,695,001 | 11/1954 | Andrews et al. | 116—137 |
| 2,564,984 | 8/1951 | Lyman | 340—406 XR |
| 2,787,778 | 4/1957 | Mulrooney | 340—75 |
| 2,971,491 | 2/1961 | Yeagley | 116—137 |
| 3,156,212 | 11/1964 | Buell | 116—137 |
| 3,231,854 | 1/1966 | Gran | 340—15 |
| 3,277,861 | 10/1966 | Moe | 116—137 |
| 3,319,247 | 5/1967 | Zajanc | 340—384 XR |

LOUIS J. CAPOZI, Primary Examiner

U.S. Cl. X.R.

340—406